US012762935B2

(12) United States Patent
Kuchiki et al.

(10) Patent No.: US 12,762,935 B2
(45) Date of Patent: Oct. 13, 2026

(54) REMOTE EVACUATION GUIDANCE SYSTEM, LAND EVACUATION GUIDANCE SYSTEM, SHIP INTERNAL EVACUATION GUIDANCE SYSTEM, AND REMOTE EVACUATION GUIDANCE METHOD

(71) Applicant: MITSUBISHI SHIPBUILDING CO., LTD., Kanagawa (JP)

(72) Inventors: Yusuke Kuchiki, Yokohama (JP); Shingen Takeda, Yokohama (JP); Toshiyuki Komiya, Yokohama (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 299 days.

(21) Appl. No.: 18/578,024

(22) PCT Filed: Apr. 22, 2022

(86) PCT No.: PCT/JP2022/018530
§ 371 (c)(1),
(2) Date: Jan. 10, 2024

(87) PCT Pub. No.: WO2023/032350
PCT Pub. Date: Mar. 9, 2023

(65) Prior Publication Data

US 2024/0321069 A1 Sep. 26, 2024

(30) Foreign Application Priority Data

Sep. 6, 2021 (JP) ................................ 2021-144905

(51) Int. Cl.
*H04W 4/42* (2018.01)
*G06F 3/01* (2006.01)
(Continued)

(52) U.S. Cl.
CPC .............. *G08B 7/066* (2013.01); *G06F 3/011* (2013.01); *G08B 25/014* (2013.01)

(58) Field of Classification Search
CPC ........... H04W 4/90; H04W 4/38; H04W 4/42; H04W 4/024; G08B 7/06; G08B 7/066;
(Continued)

(56) References Cited

U.S. PATENT DOCUMENTS

| | | | | |
|---|---|---|---|---|
| 2013/0103309 A1* | 4/2013 | Cai | ........................ | G08B 7/066 701/515 |
| 2018/0089785 A1 | 3/2018 | Imoto et al. | | |

(Continued)

FOREIGN PATENT DOCUMENTS

| | | |
|---|---|---|
| CN | 107408286 A | 11/2017 |
| CN | 108574930 A | 9/2018 |

(Continued)

OTHER PUBLICATIONS

IP.com search history (Year: 2026).*
International Search Report and Written Opinion of International Application No. PCT/JP2022/018530 mailed Jul. 26, 2022; 11pp.

*Primary Examiner* — Moustapha Diaby
(74) *Attorney, Agent, or Firm* — HAUPTMAN HAM, LLP

(57) ABSTRACT

This remote evacuation guidance system comprises a plurality of types of sensors provided at a plurality of positions in a ship, an evacuation guidance device provided in the ship, and a land evacuation guidance system provided on the land. The land evacuation guidance system acquires sensor information detected by the sensors, reproduces the internal situation of the ship so as to enable a simulated experience thereof on the basis of the sensor information, sets an evacuation route on the basis of the reproduced internal situation of the ship, generates evacuation guidance instruction information for guiding a passenger to evacuate along
(Continued)

the evacuation route, and transmits the evacuation guidance instruction information to the evacuation guidance device in the ship.

8 Claims, 5 Drawing Sheets

(51) Int. Cl.

| | |
|---|---|
| ***G08B 7/06*** | (2006.01) |
| ***G08B 25/01*** | (2006.01) |
| ***H04W 4/38*** | (2018.01) |
| ***H04W 4/90*** | (2018.01) |

(58) Field of Classification Search

CPC ....... G08B 25/014; B63B 79/10; B63B 43/00; B63B 45/00; G01D 21/02; G06F 3/01; G06F 3/011; G06Q 50/10

USPC ...................................................... 455/404.2

See application file for complete search history.

(56) References Cited

U.S. PATENT DOCUMENTS

| | | | | |
|---|---|---|---|---|
| 2019/0026949 | A1* | 1/2019 | Alabastro | ............. G06T 19/006 |
| 2021/0129344 | A1* | 5/2021 | Yeom | ......................... B25J 9/16 |

FOREIGN PATENT DOCUMENTS

| | | | | |
|---|---|---|---|---|
| CN | 109887369 | A | 6/2019 | |
| CN | 111609856 | A | 9/2020 | |
| EP | 3900309 | B1 | 5/2022 | |
| JP | 2003109149 | A | 4/2003 | |
| JP | 2008257385 | A | 10/2008 | |
| JP | 2015103081 | A | 6/2015 | |
| JP | 5889267 | B2 | 3/2016 | |
| JP | 2017103509 | A | 6/2017 | |
| KR | 1020170120160 | A | 10/2017 | |
| KR | 1020180065281 | A | 6/2018 | |
| KR | 1020180130950 | A | 12/2018 | |
| KR | 20210096454 | A | 8/2021 | |
| WO | WO-2020187668 | A1 * | 9/2020 | ............. H04L 67/12 |

* cited by examiner

REMOTE EVACUATION GUIDANCE SYSTEM, LAND EVACUATION GUIDANCE SYSTEM, SHIP INTERNAL EVACUATION GUIDANCE SYSTEM, AND REMOTE EVACUATION GUIDANCE METHOD

RELATED APPLICATIONS

The present application is a National Phase of International Application Number PCT/JP2022/018530 filed Apr. 22, 2022 and claims priority to Japanese Application Number 2021-144905 filed Sep. 6, 2021.

TECHNICAL FIELD

The present disclosure relates to a remote evacuation guidance system, a land evacuation guidance system, an onboard evacuation guidance system, and a remote evacuation guidance method.

Priority is claimed on Japanese Patent Application No. 2021-144905, filed on Sep. 6, 2021, the content of which is incorporated herein by reference.

BACKGROUND ART

When a fire or flooding occurs in a ship, passengers are encouraged to evacuate by onboard broadcasting, and crew members guide the passengers to evacuate. PTL 1 discloses a system that supports evacuation guidance by onboard broadcasting and the like and reliably evacuates passengers. For example, in the system disclosed in PTL 1, a management device transmits information (for example, the number and position of nearby passengers, an evacuation direction, an evacuation site, and the like) necessary for guiding the passengers to evacuate to a mobile terminal possessed by a crew member, and the crew member guides the passengers to the evacuation site on the basis of this information.

CITATION LIST

Patent Literature

[PTL 1] Japanese Unexamined Patent Application Publication No. 2003-109149

SUMMARY OF INVENTION

Technical Problem

The evacuation guidance support system disclosed PTL 1 can be used to perform the evacuation guidance of the passengers. However, in an unmanned operation ship or a labor-saving ship with a limited number of crew members, the evacuation guidance of the passengers by the crew members is limited. Therefore, an alternative means for the evacuation guidance by the crew members is required.

The present disclosure provides a remote evacuation guidance system, a land evacuation guidance system, an onboard evacuation guidance system, and a remote evacuation guidance method that can solve the above problem.

Solution to Problem

According to an aspect of the present disclosure, there is provided a remote evacuation guidance system including: a plurality of types of sensors that are provided at a plurality of positions in a ship; an evacuation guidance device that is provided in the ship; and a land evacuation guidance system that is provided on land. The land evacuation guidance system includes a sensor information acquisition unit that acquires sensor information detected by the sensors, an onboard situation reproduction unit that reproduces a situation in the ship on the basis of the sensor information such that the situation is capable of being experienced in a simulated manner, an evacuation route setting unit that sets an evacuation route on the basis of the reproduced situation in the ship, a guidance information generation unit that generates evacuation guidance instruction information for guiding evacuation of a passenger along the evacuation route, and a transmission unit that transmits the evacuation guidance instruction information to the evacuation guidance device.

According to an aspect of the present disclosure, there is provided a land evacuation guidance system including: a sensor information acquisition unit that acquires sensor information detected by a plurality of types of sensors provided at a plurality of positions in a ship; an onboard situation reproduction unit that reproduces a situation in the ship on the basis of the sensor information such that the situation is capable of being experienced in a simulated manner; an evacuation route setting unit that sets an evacuation route on the basis of the reproduced situation in the ship; a guidance information generation unit that generates evacuation guidance instruction information for guiding evacuation of a passenger along the evacuation route; and a transmission unit that transmits the evacuation guidance instruction information to an evacuation guidance device provided in the ship.

According to an aspect of the present disclosure, there is provided an onboard evacuation guidance system including: a plurality of types of sensors that are provided at a plurality of positions in a ship; an evacuation guidance device that is provided in the ship; an acquisition unit that acquires sensor information detected by the sensors; a control unit that controls the evacuation guidance device; and a communication unit that transmits the sensor information acquired by the acquisition unit to a land evacuation guidance system and receives a control signal for controlling the evacuation guidance device from the land evacuation guidance system.

According to an aspect of the present disclosure, there is provided a remote evacuation guidance method including: a step of allowing a land evacuation guidance system that is provided on land to acquire sensor information detected by a plurality of types of sensors provided at a plurality of positions in a ship; a step of allowing the land evacuation guidance system to reproduce a situation in the ship on the basis of the sensor information such that the situation is capable of being experienced in a simulated manner; a step of allowing the land evacuation guidance system to set an evacuation route on the basis of the reproduced situation in the ship; a step of allowing the land evacuation guidance system to generate evacuation guidance instruction information for guiding evacuation of a passenger along the evacuation route; and a step of transmitting the evacuation guidance instruction information to an evacuation guidance device provided in the ship.

Advantageous Effects of Invention

According to the remote evacuation guidance system, the land evacuation guidance system, the onboard evacuation guidance system, and the remote evacuation guidance method described above, the evacuation guidance of the passengers in the ship can be performed from land.

DESCRIPTION OF EMBODIMENTS

Embodiment

Hereinafter, an evacuation guidance system according to the present disclosure will be described with reference to FIGS. 1 to 5.

(System Configuration)

Figure 1:
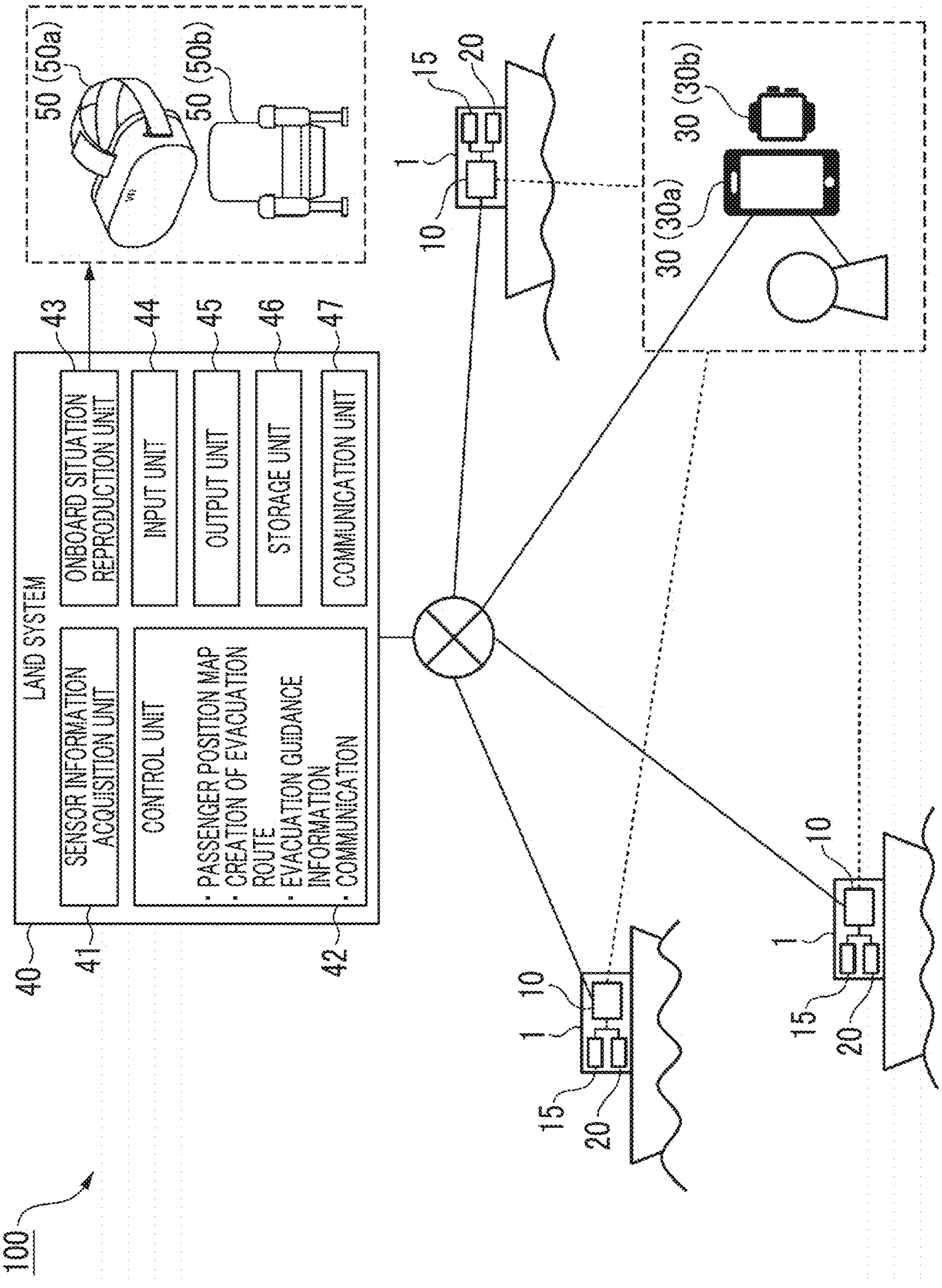
FIG. 1 is a first diagram illustrating an example of an evacuation guidance system according to an embodiment.
Figure 2:
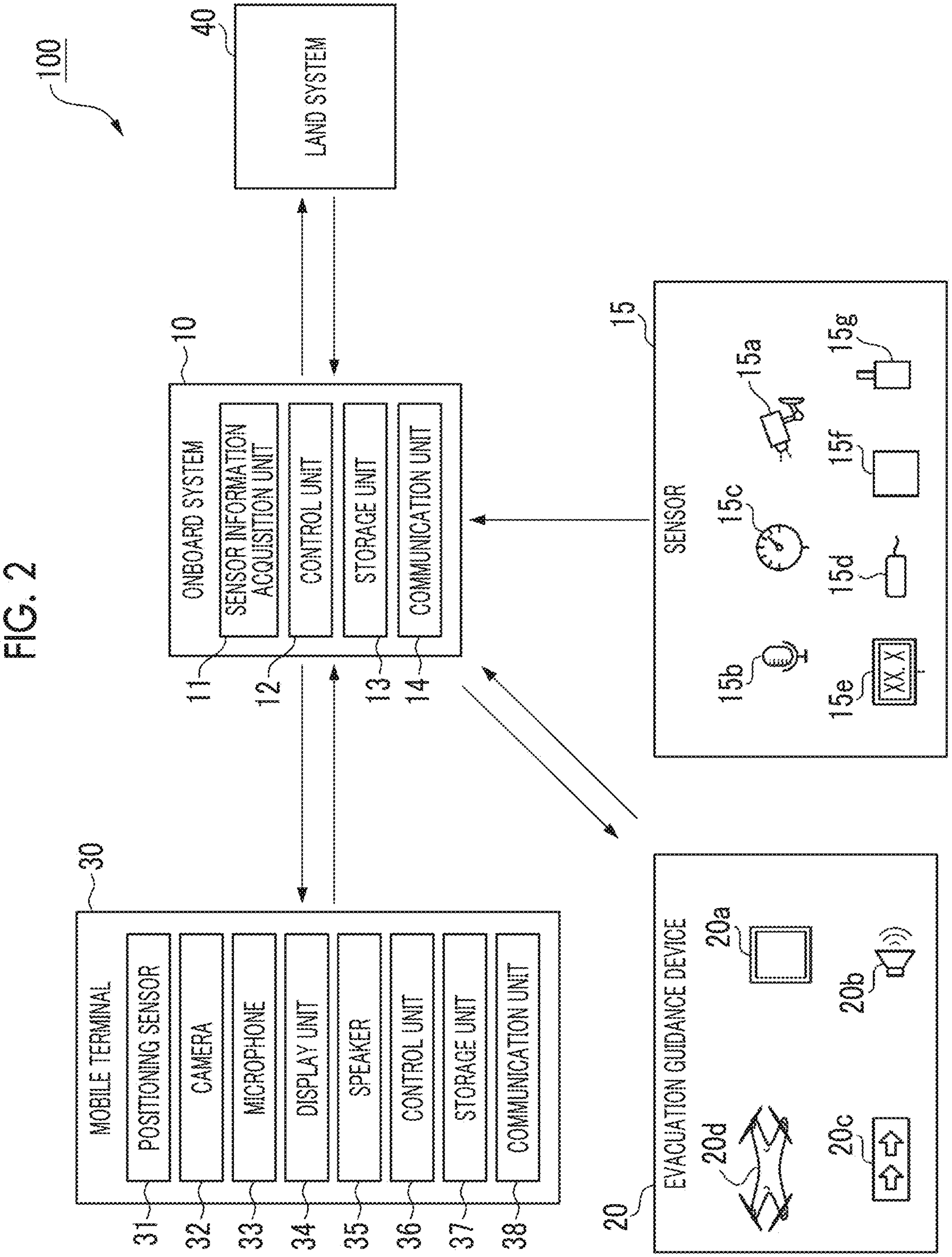
FIG. 2 is a second diagram illustrating an example of the evacuation guidance system according to the embodiment.

FIGS. 1 and 2 are a first diagram and a second diagram illustrating an example of an evacuation guidance system according to an embodiment, respectively.

An evacuation guidance system 100 includes an onboard system 10, a sensor 15, and an evacuation guidance device 20 that are provided in each of one or a plurality of ships 1, a mobile terminal 30 that is possessed by a passenger or a crew member who is on board the ship 1, and a land system 40 and a simulated experience device 50 that are provided in a monitoring station on land. The evacuation guidance system 100 is a system in which the land system 40 monitors an aspect of the inside of the plurality of ships 1 and, when a fire, flooding, or the like occurs in one or a plurality of ships among the ships 1 to be monitored, the land system 40 performs evacuation guidance on the passenger on the ship 1 in which a disaster has occurred. The land system 40 and the onboard system 10 of the ship 1 are connected through a network such that they can communicate with each other. The onboard system 10, the sensor 15, the evacuation guidance device 20, and the mobile terminal 30 are connected such that they can communicate with one another. The land system 40 and the mobile terminal 30 are connected such that they can communicate with each other.

The onboard system 10 manages information related to the evacuation guidance of the passengers and performs ship-shore communication with the land system 40. The sensors 15 are sensors that are provided at various positions in the ship and include various types of sensors, such as a camera 15*a*, a microphone 15*b*, a tilt sensor 15*c*, a temperature sensor 15*d*, a humidity sensor 15*e*, an odor sensor 15*g*, a vibration sensor 15*f*, and an acceleration sensor, such that they can detect a situation in the ship from various aspects. The evacuation guidance devices 20 are various devices having a function of notifying the passengers of an evacuation direction and an evacuation route, such as a display device 20*a*, a speaker 20*b*, a direction indicator 20*c*, and a robot 20*d*. The mobile terminal 30, such as a smartphone 30*a* or a wearable terminal 30*b*, possessed by the passenger or the like is used for locating the passenger and for communication with the passenger who is being evacuated and also functions as the sensor 15 and the evacuation guidance device 20. The passenger and an observer on land may communicate with each other through the camera 15*a*, the microphone 15*b*, the display device 20*a*, the speaker 20*b*, the robot 20*d*, and the like that are provided in the ship.

(Land System)

The land system 40 has a function of collecting information detected by the sensors 15 of each ship 1 and reproducing an aspect of the inside of each ship 1 in real time on the basis of the collected information, using virtual reality (VR) technology, 4DX (registered trademark) technology, or the like. The observer is present in the monitoring station on land. The observer can monitor the aspect of the inside of the plurality of ships 1 while experiencing the aspect of the inside of the ships 1 in a simulated manner. The observer experiences the aspect of each position in the ship which has been reproduced by the land system 40 in the simulated manner, using the simulated experience device 50 such as a head-mounted display 50*a* or a chair 50*b*. The head-mounted display 50*a* provides, for example, the observer with a simulated experience of a three-dimensionally reproduced video, voice, and odor in the ship. The chair 50*b* can be moved up and down, back and forth, and left and right and provides the observer with a simulated experience of tilting and shaking in the ship. Further, the chair 50*b* is provided with smoke, scent, wind, and mist (water) injectors. For example, smoke and odor may be injected from these injectors to reproduce the state of smoke, odor, wind, and water spray in the ship such that the observer can experience them in a simulated manner. On the basis of the information detected by the plurality of types of sensors 15 at various positions in the ship, the observer experiences the reproduced situation in the ship in the simulated manner, understands a damage situation of the entire ship, and sets an evacuation route and an appropriate evacuation site where the passengers are easily evacuated.

The land system 40 includes a sensor information acquisition unit 41, a control unit 42, an onboard situation reproduction unit 43, an input unit 44, an output unit 45, a storage unit 46, and a communication unit 47.

The sensor information acquisition unit 41 acquires the sensor information detected by the sensors 15 of the ship 1. The sensor information acquisition unit 41 acquires position information of the mobile terminal 30 possessed by the passenger. The sensor information acquisition unit 41 acquires information, such as an occurrence status of a fire or the like detected by a safety detection device that is provided in the ship, alarm information issued by a notification device, and an operation status of a safety maintenance device.

The control unit 42 performs a process necessary for the evacuation guidance of the passengers. For example, the control unit 42 maps the position information of the mobile terminal 30 to map information in the ship to generate passenger map information that enables the observer to locate the passenger in the ship. The control unit 42 calculates the evacuation route of the passenger on the basis of an instruction from the observer. For example, the observer inputs information of the position or range in the ship where it is not preferable for the passenger to pass during evacuation and information of a safe position or range to the land system 40 on the basis of the simulated experience of various positions in the ship. The control unit 42 calculates a safe evacuation route on the basis of the input information. Alternatively, the control unit 42 may determine a safe evacuation route from a plurality of predetermined evacuation routes on the basis of the above-described information input by the observer, or may select several candidates for the safe evacuation route and present the selected candidates such that the observer designates an appropriate evacuation route from them to determine the evacuation route. For example, the control unit 42 generates a control signal for controlling the evacuation guidance device 20 on the basis of the calculated evacuation route. For example, in a case where movement in a direction from the stern to the bow is determined for a passage provided along a longitudinal direction of a hull in the calculated evacuation route, the control unit 42 generates a control signal that causes the direction indicator 20*c* or the display device 20*a* provided on the passage to display information for guiding the movement in the direction from the stern to the bow. The control unit 42 generates a control signal that causes the speaker 20*b* provided on the passage to output a voice for guiding the movement in the direction from the stern to the bow. For example, the control unit 42 has a function capable of communicating with the mobile terminal 30 using a voice and a video. This communication function may be, for example, a communication function provided in a general videophone or a Web conferencing system. In addition, the control unit 42 has an image and voice processing and editing function for creating a moving image that shows an aspect of a position which is a little further from the position of a passenger along the evacuation route or an aspect of other passengers related to the passenger.

The onboard situation reproduction unit 43 generates virtual reality space information from the information, such as a video, a voice, vibration, and odor, acquired by the sensor information acquisition unit 41 using generally provided VR technology or 4DX (registered trademark) technology or generates control information to be output to the simulated experience device 50. The onboard situation reproduction unit 43 generates information that enables the observer to experience the situation in the ship in the simulated manner using the simulated experience device 50, on the basis of at least one or both of the VR technology and the 4DX (registered trademark) technology.

The input unit 44 is configured by using an input device such as a keyboard, a mouse, a touch panel, a button, a microphone, or a camera. The input unit 44 receives a user's input to the land system 40. The input unit 44 outputs the content of the received input to the control unit 42.

The output unit 45 outputs information to, for example, a display device or a speaker (not illustrated) that is connected to the land system 40. For example, the output unit 45 outputs the passenger map information, the information of the calculated evacuation route, and the like to the display device. In a case where the passenger and the observer communicate with the passenger using the evacuation guidance device 20 and the mobile terminal 30, the output unit 45 outputs the image or voice transmitted from the mobile terminal 30 to the display device or the speaker, respectively.

The storage unit 46 is configured by using a storage device, such as an HDD or a flash memory, and stores the sensor information and various types of information.

The communication unit 47 communicates with the onboard system 10 and the mobile terminal 30.

(Onboard System)

The onboard system 10 includes a sensor information acquisition unit 11, a control unit 12, a storage unit 13, and a communication unit 14. The sensor information acquisition unit 11 acquires the sensor information detected by the sensors 15 from the sensors 15 provided at various positions in the ship. The sensor information acquisition unit 11 acquires the position information of the mobile terminal 30 from the mobile terminal 30. The sensor information acquisition unit 11 acquires the occurrence status of a fire or the like detected by the safety detection device (a fire detection and warning device, a flooding detection device, or the like) provided in the ship, alarm information issued by the notification device, and information indicating the operation status of the safety maintenance device (fire doors, watertight doors, sprinklers, and the like).

For example, the control unit 12 controls communication with the evacuation guidance device 20, the mobile terminal 30, and the land system 40. The control unit 12 controls the evacuation guidance device 20 on the basis of an instruction from the land system 40. The storage unit 13 is configured by using a storage device, such as an HDD or a flash memory, and stores the sensor information and various types of information. The communication unit 14 communicates with other devices.

(Mobile Terminal)

The mobile terminal 30 includes a positioning sensor 31, a camera 32, a microphone 33, a display unit 34, a speaker 35, a control unit 36, a storage unit 37, and a communication unit 38. The positioning sensor 31 measures the position information of the mobile terminal 30. The positioning sensor 31 is a receiver of a satellite positioning system such as a global positioning system (GPS) receiver. The camera 32 captures a video around the mobile terminal 30. The microphone 33 picks up voices around the mobile terminal 30. The display unit 34 is configured by using a display device, such as a liquid crystal display, and displays, for example, the evacuation route and the evacuation direction. The speaker 35 outputs information, such as the evacuation direction, by voice. The control unit 36 controls the operation of the mobile terminal 30. The storage unit 13 is configured by using a storage device, such as an HDD or a flash memory, and stores various types of information. The communication unit 14 communicates with the onboard system 10 and the land system 40.

(Operation)

Figure 3:
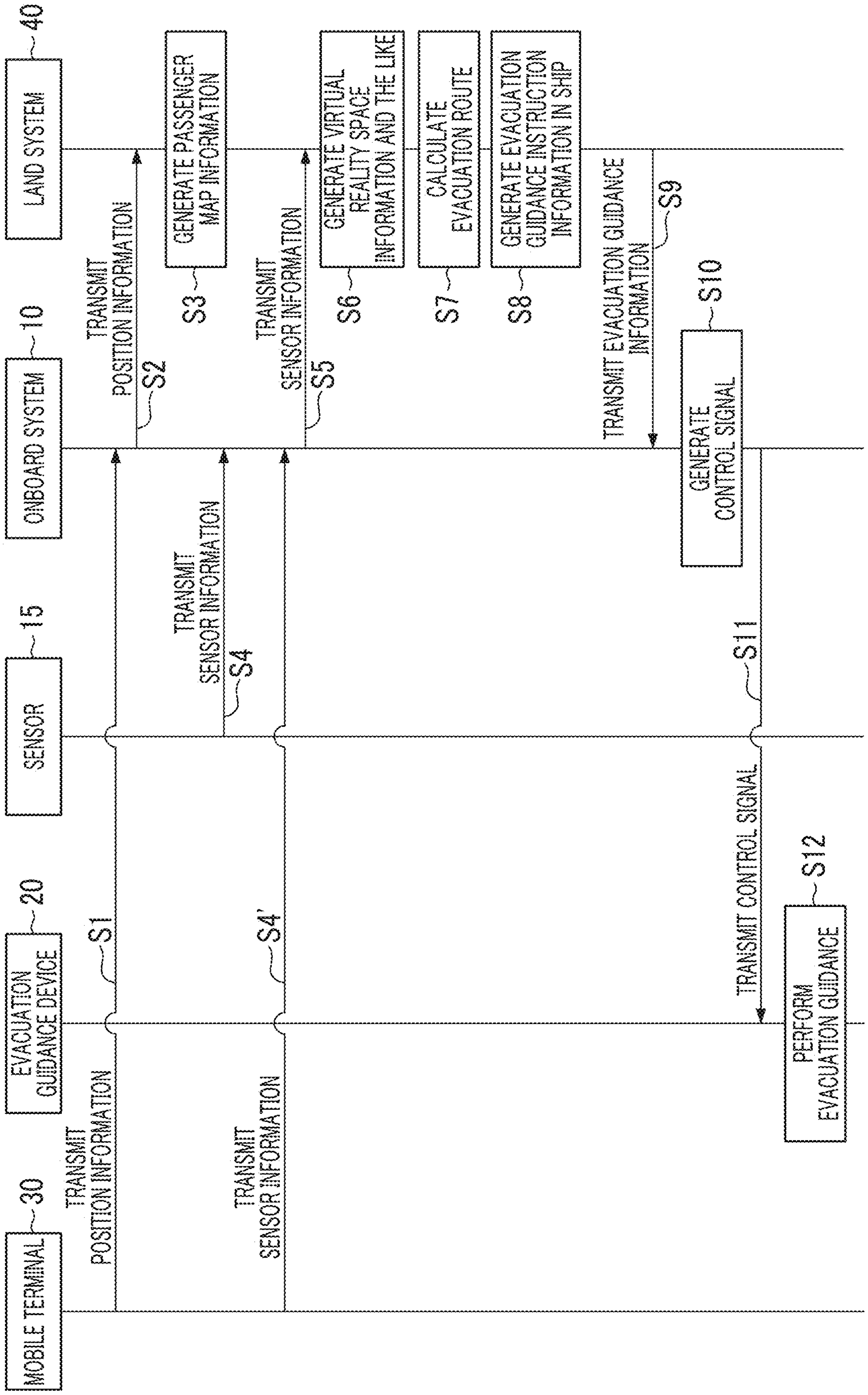
FIG. 3 is a first diagram illustrating an example of an operation of the evacuation guidance system according to the embodiment.
Figure 4:
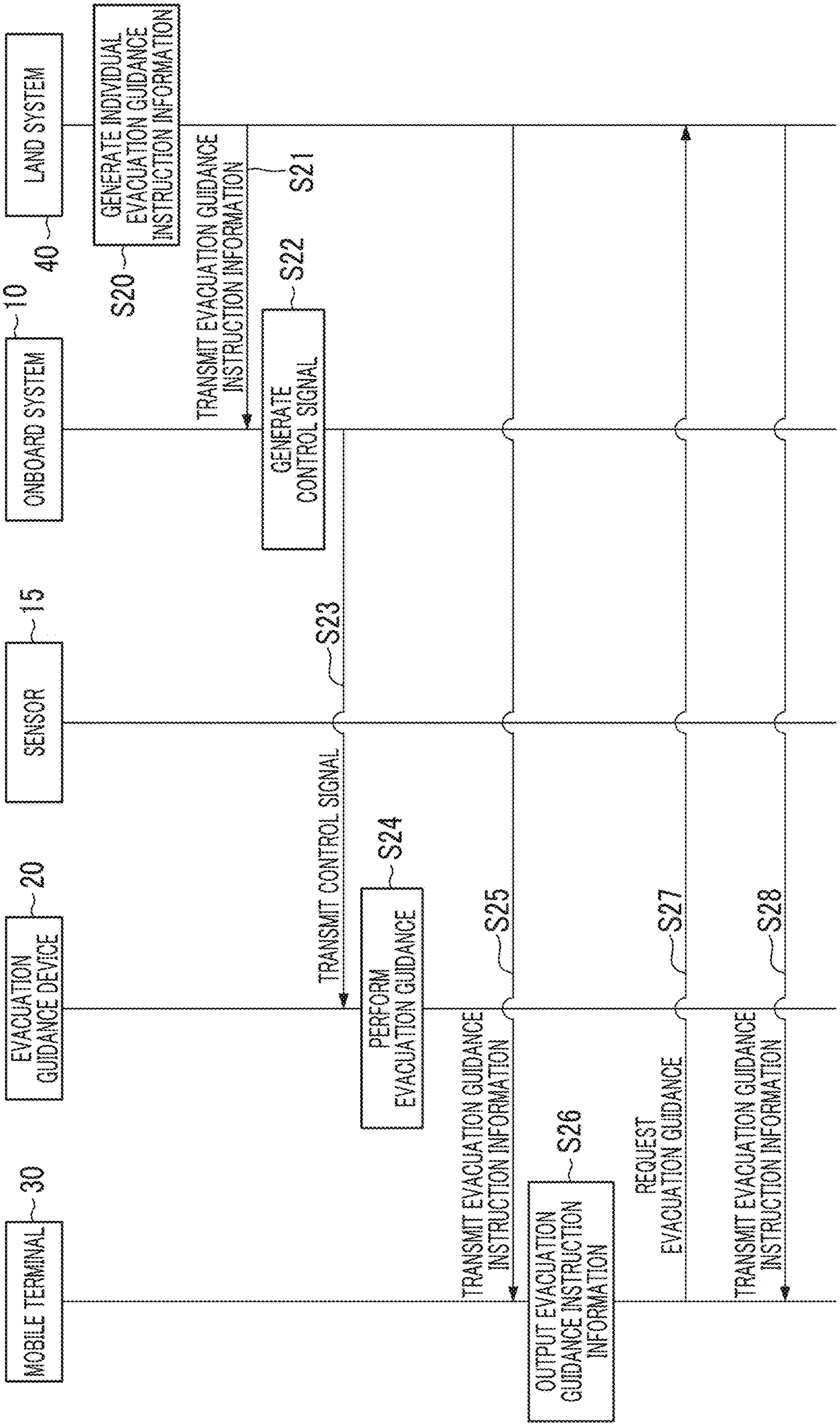
FIG. 4 is a second diagram illustrating an example of the operation of the evacuation guidance system according to the embodiment.

Next, the operation of the evacuation guidance system 100 will be described with reference to FIGS. 3 and 4. FIGS. 3 and 4 are a first diagram and a second diagram illustrating an example of the operation of the evacuation guidance system according to the embodiment, respectively. The ship 1 is provided with a fire detection and warning device and a flooding detection device. When a fire occurs in the ship, the fire detection and warning device is operated. When flooding occurs in the ship, the flooding detection device is operated. When these safety detection devices are operated, information related to the operation is transmitted from the onboard system 10 to the land system 40, and the output unit 45 outputs the occurrence of the fire or the flooding to the display device. The evacuation guidance of the passengers is started at the discretion of a captain of the ship 1 or the observer on land, and the evacuation guidance system 100 starts its operation.

<Evacuation Guidance for Large Number of Passengers>

First, an example of an operation in a case where evacuation guidance for a large number of passengers is performed will be described with reference to FIG. 3. The mobile terminal 30 transmits the position information and identification information of the host device measured by the positioning sensor 31 to the onboard system 10 through the communication unit 38 (Step S1). In the onboard system 10, the communication unit 14 receives the transmitted position information and the like and transmits the received information to the land system 40 on the basis of an instruction from the control unit 12 (Step S2). In the land system 40, the control unit 42 acquires the position information and identification information of the mobile terminal 30 through the communication unit 47 and stores the acquired information in the storage unit 46. The control unit 42 maps the acquired position information of the plurality of mobile terminals 30 to the map information of the ship 1 to generate passenger map information indicating at which position in the ship each passenger is present (Step S3). The position information of the ship 1 is separately transmitted to the land system 40 and can be mapped to the map information of the ship. The output unit 45 outputs the passenger map information to the display device.

In the ship 1, the sensor information detected by the sensors 15 and the identification information of the host device are transmitted to the onboard system 10 (Step S4). The passenger or the crew member may transmit an image or a voice (sensor information) detected by the camera 32 or the microphone 33 of the mobile terminal 30 possessed by the passenger or the crew member to the onboard system 10 which is the host device (Step S4'). In the onboard system 10, the communication unit 14 receives the transmitted sensor information and transmits the received sensor information to the land system 40 on the basis of an instruction from the control unit 12 (Step S5). In the land system 40, the control unit 42 acquires the sensor information through the communication unit 47 and stores the acquired sensor information in the storage unit 46. The control unit 42 summarizes the sensor information detected at various positions in the ship for each of the positions where the sensors are installed on the basis of the identification information of the sensors and outputs the sensor information to the onboard situation reproduction unit 43. For example, the onboard situation reproduction unit 43 generates virtual reality space information and the like using the VR technology (Step S6) and outputs the generated information to the simulated experience device 50 such as the head-mounted display 50*a*. The observer performs a predetermined operation on the land system 40 or the simulated experience device 50 to switch the position in the ship and experiences the situation at each portion in the ship reproduced by the onboard situation reproduction unit 43. In this way, for example, it is examined that a passage A is not suitable for the evacuation route of the passengers because flames are approaching and that a passage B has a portion which is filled with smoke, but evacuation is possible. The observer checks the positions of the passengers with reference to the passenger map information generated in Step S6 and, for example, sets an evacuation route for each passenger in a certain range or examines how to guide the passengers to evacuate efficiently, depending on the number of passengers in the area. Then, the observer inputs information, such as an impassable passage, a safe passage, and a passage recommended as a portion of the evacuation route, to the land system 40. The input unit 44 outputs the input information to the control unit 42. For example, the control unit 42 connects the passages in the ship to calculate an evacuation route from each area where the passengers are present to a predetermined evacuation site on the basis of the map information in the ship (information of the passages in the ship), the passenger map information, the information of the impassable passages designated by the observer, and the like (Step S7). The control unit 42 may display the calculated evacuation route on the display device through the output unit 45 and determine the evacuation route with the approval of the observer.

When the evacuation route is calculated, the control unit 42 generates evacuation guidance instruction information in the ship (Step S8). For example, the map information in the ship includes the installation positions of the evacuation guidance devices 20, such as the display device 20*a*, the speaker 20*b*, and the direction indicator 20*c*, and the control unit 42 compares the evacuation route calculated in Step S7 with the evacuation guidance devices 20 at each position to calculate the direction in which the passengers should be guided by the display device 20*a*, the speaker 20*b*, and the direction indicator 20*c* at each position, and sets display content (for example, an arrow indicating a traveling direction), content of voice output (for example, "Please proceed in the direction of oo"), and an indicating direction for each evacuation guidance device 20. The control unit 42 instructs the communication unit 47 to transmit the evacuation guidance instruction information in the ship. The communication unit 47 transmits the evacuation guidance instruction information in the ship to the onboard system 10 (Step S9). In the onboard system 10, the control unit 12 acquires the evacuation guidance instruction information for each evacuation guidance device 20 through the communication unit 14. The control unit 12 generates a control signal to be output to each evacuation guidance device 20 on the basis of the evacuation guidance instruction information for each evacuation guidance device 20 (Step S10). For example, when the evacuation guidance instruction information in the ship transmitted from the land system 40 includes the direction to guide the passengers and precautions to be taken against smoke, the control unit 12 generates an arrow indicating the direction to guide the passengers, text information, such as "Please be careful of smoke and proceed in the direction of the arrow", and a command signal for instructing the display of the text information for the display device 20*a* provided in the passage B. The control unit 12 also generates control signals for the other evacuation guidance devices 20. The communication unit 14 transmits the control signals generated by the control unit 12 to each evacuation guidance device 20 (Step S11). The evacuation guidance devices 20 provided at each position in the ship receive the control signals and start evacuation guidance (Step S12). For example, the display device 20*a* provided on the passage B displays an image in which an arrow indicating the guidance direction and a message, such as "Please be careful of smoke and proceed in the direction of the arrow", are displayed. The process in Step S8 may be configured to be performed by the control unit 12 of the onboard system 10.

<Evacuation Guidance for Individual Passengers>

Next, an example of an operation in a case where evacuation guidance for the individual passengers is performed will be described with reference to FIG. 4. In parallel with the process illustrated in FIG. 3, the observer on land generates individual evacuation guidance instruction information for passengers who were late to escape, passengers who are located far away from other passengers, passengers who do not have the evacuation guidance device 20 around them, and the like (Step S20). For example, the observer specifies an isolated passenger and the position of the passenger on the basis of the passenger map information and plans a movement route that guides the specified passenger to the evacuation route used by a large number of other passengers. Alternatively, when the observer designates the position of the specified passenger and a position where the passenger joins the evacuation route, the control unit 42 may perform the same process as that in Step S7 on the basis of the information of the impassable passage and the safe passage previously set by the observer on the basis of the simulated experience to calculate a movement route for the isolated passenger to move to the evacuation route. When the movement route of the isolated passenger is calculated, the control unit 42 generates the individual evacuation guidance instruction information. For example, the control unit 42 generates information for instructing the robot 20*d* to head to the position of the isolated passenger and for moving the passenger from the position along the movement route and transmits the evacuation guidance instruction information to the onboard system 10 (Step S21). In the onboard system 10, the control unit 12 generates a control signal for moving the robot 20*d* along the route on the basis of the received evacuation guidance instruction information. When the robot 20*d* arrives at the position of the isolated passenger, the control unit 12 generates a control signal that causes the robot 20*d* to perform an operation of calling on the passenger to follow the robot 20*d* for evacuation (for example, the robot 20*d* outputs a voice indicating the content of the operation) (Step S22). The control unit 12 transmits the generated control signal to the robot 20*d* (Step S23). The robot 20*d* that has received the control signal performs the evacuation guidance (Step S24).

The individual evacuation guidance instruction information may be generated for each mobile terminal 30 (Step S20). For example, the observer experiences a situation around the position where the passenger who was late to escape is present in the simulated manner, using the simulated experience device 50, and checks what evacuation route the passenger can take and what the surrounding situation is. The control unit 42 generates map information (evacuation guidance instruction information) indicating a movement route for movement to an evacuation route of each passenger who was late to escape or an evacuation route used by a large number of other passengers and transmits the map information to the mobile terminal 30 of the corresponding passenger on the basis of an instruction from the observer (Step S25). In the mobile terminal 30, the display unit 34 outputs the evacuation guidance instruction information (Step S26). The passenger starts evacuation along the movement route displayed on the display unit 34. The passenger who is being evacuated may communicate with the observer on land. For example, in a case where the mobile terminal 30 is a smartphone, the observer may make a call to the mobile terminal 30 and guide the passenger to evacuate while telling the surrounding situation experienced in the simulated manner with the simulated experience device 50, the evacuation situation of other passengers, the situation of a disaster in the ship, and the like.

The passenger can request the observer on land to guide evacuation through the mobile terminal 30. When requesting the evacuation guidance, the passenger performs a predetermined operation on the mobile terminal 30 to perform mutual communication with the land system 40 using a communication function (for example, communication software) of the land system 40 and requests the evacuation guidance (Step S27). For example, the passenger takes an image of the surroundings with the camera 32 and inquires about in which direction the passenger should flee, what the situation of the movement route is, and the like by voice while transmitting the image to the land system 40. In response to this, the observer transmits the evacuation guidance instruction information including voice, images, and the like using the communication function (Step S28) to perform the evacuation guidance. For example, the observer experiences the situation of the movement route set for the passenger (poor visibility, strong smell of smoke, and the like) in the simulated manner using the simulated experience device 50 and verbally communicates the content of the simulated experience to the passenger to guide the passenger to the movement route. The mobile terminal 30 outputs the voice information from the speaker 35. For example, in a situation in which the ship 1 is greatly tilted or violently shaken, the observer experiences the situation in the simulated manner and understands that the passenger is not in a condition to move smoothly along the proposed movement route. For example, the observer can give advice of "Please hold on to the handrail and proceed slowly" while telling the position of the handrail. For example, the observer may process the video captured by the camera 15*a* provided along the movement route using the land system 40 and transmit the processed image to the mobile terminal 30 using the communication function to guide in advance the aspect of the inside of the ship in a case where the passenger proceeded along the movement route from the position. For example, in a case where the passenger leaves a family member or a friend during evacuation, the observer can inform the passenger of the evacuation situation or safety of the friend or the like from the position information of the mobile terminal 30 possessed by the family member or the friend. Therefore, the passenger can evacuate with peace of mind. In this way, the passenger is evacuated to the evacuation site by the evacuation guidance from the land system 40.

In FIGS. 3 and 4, before calculating the evacuation route, the observer experiences the situation in the ship in the simulated manner in order to plan an appropriate evacuation route. However, since the situation of the disaster changes from moment to moment, the observer may continue to experience the situation in the ship, which has been reproduced on the basis of the latest sensor information, in the simulated manner and perform, for example, an operation of changing the evacuation route as appropriate, using the processes illustrated in FIGS. 3 and 4. In FIG. 4, the mobile terminal 30 of the passenger who was late to escape or the isolated passenger is notified of the individual evacuation guidance instruction information. However, the information of the evacuation route through which each passenger should be evacuated may be transmitted to the mobile terminals 30 of all of the passengers.

(Effects)

As described above, according to this embodiment, the information collected by the cameras 15*a* and various sensors 15 for detecting other information (for example, sound, heat, odor, tilt, vibration, and the like) which are provided at various positions in the ship is transmitted to the land system 40 using a ship-shore communication system (communication unit 14) of the ship 1 (for example, the ship 1 may be an unmanned operation ship or a labor-saving ship). Then, the land system 40 reproduces the situation in the ship using the VR technology and the 4DX (registered trademark) technology. Therefore, the observer can understand the situation in the ship as if the observer is on board while being on land. It is possible to reproduce the situation at each position in the ship on the basis of the information detected by the sensors 15 provided at various positions in the ship. Therefore, the observer can experientially understand the situation of not only a specific place but also all places in the ship. As a result, the observer can determine an evacuation route that not only avoids the position where the fire detection and warning device has simply detected the fire, but also avoids dangerous places detected by the sensors 15 at various positions in the ship. According to this embodiment, the observer on land and each passenger can bidirectionally communicate with each other using the land system 40 and the mobile terminal 30. The observer can perform the evacuation guidance according to the situation of the passenger, on the basis of the situation in the ship reproduced for the place where the passenger is present. The observer can tell the passenger the aspect in the ship that the passenger would not be able to understand or can give the passenger information of a place that is a little further along the evacuation route on the basis of the situation in the ship reproduced for a place away from the position where the passenger is present to smoothly evacuate the passenger. According to this embodiment, the land system 40 can transmit the evacuation guidance instruction information to the evacuation guidance device 20 in the ship to control the operation of the evacuation guidance device 20. Therefore, it is possible to collectively guide a large number of passengers, who can see and hear the information output by the evacuation guidance device 20, to evacuate. The land system 40 performs the evacuation guidance on the passengers on the ship as described above. Therefore, for example, in a case where the ship 1 is an unmanned operation ship or a labor-saving ship, when the crew member is not able to perform the evacuation guidance on the passengers or even when there is a shortage of manpower, the land system 40 can compensate for the absence or labor saving of the crew members and perform the evacuation guidance in the same manner as the evacuation guidance by the crew member on the ship. In the land system 40, a larger number of persons than those on the ship may be put into the evacuation guidance. Therefore, it is possible to allocate more human resources than those in the normal evacuation guidance by the crew members and to expect more efficient and rapid evacuation guidance. In the land system 40, it is possible to calmly perform the evacuation guidance, without being affected by a flame or flooding, while experiencing the situation in the ship in a realistic manner. In the land system 40, it is possible to perform monitoring and evacuation guidance on a plurality of ships 1 in parallel at the same time. Therefore, it is possible to contribute to the unmanned operation and labor saving of the ship 1.

Figure 5:
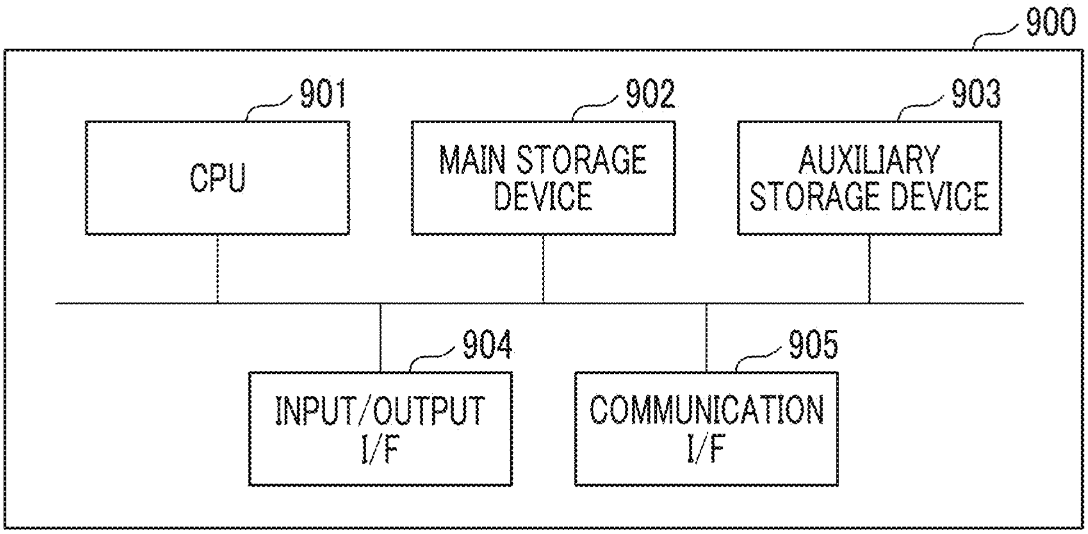
FIG. 5 is a block diagram illustrating an example of a hardware configuration of the evacuation guidance system according to the embodiment.

FIG. 5 is a block diagram illustrating an example of a hardware configuration of the evacuation guidance system according to the embodiment.

A computer 900 includes a CPU 901, a main storage device 902, an auxiliary storage device 903, an input/output interface 904, and a communication interface 905. The onboard system 10, the mobile terminal 30, and the land system 40 are implemented by the computer 900. Further, each of the above-described functions is stored in the auxiliary storage device 903 in the form of a program. The CPU 901 reads out a program from the auxiliary storage device 903, deploys the program in the main storage device 902, and performs the above-described processes according to the program. The CPU 901 secures a storage area in the main storage device 902 according to the program. The CPU 901 secures a storage area for storing data, which is being processed, in the auxiliary storage device 903 according to the program.

A program for implementing all or some of the functions of the onboard system 10, the mobile terminal 30, and the land system 40 may be recorded on a computer-readable recording medium. The program recorded on the recording medium may be read into a computer system and executed to perform processes by each functional unit. It is assumed that the "computer system" described herein includes hardware such as an OS and peripheral devices. It is assumed that the "computer system" also includes a homepage providing environment (or a display environment) in a case where a WWW system is used. The "computer-readable recording medium" refers to a portable medium, such as a CD, a DVD, or a USB, or a storage device, such as a hard disk drive, provided in the computer system. In a case where this program is distributed to the computer 900 by a communication line, the computer 900 which has received the distribution of the program may deploy the program into the main storage device 902 to perform the above-described processes. The above-described program may be a program for implementing some of the above-mentioned functions or a program for further implementing the above-mentioned functions in combination with the program already recorded on the computer system.

As described above, some embodiments according to the present disclosure have been described. However, all of these embodiments are presented as examples and are not intended to limit the scope of the invention. These embodiments can be implemented in various other forms, and various omissions, replacements, and changes can be made without departing from the gist of the invention. These embodiments and modifications thereof are included in the scope of the invention described in the claims and the equivalent scope thereof, as well as in the scope and gist of the invention.

Supplementary Notes

For example, the remote evacuation guidance system, the land evacuation guidance system, the onboard evacuation guidance system, and the remote evacuation guidance method described in each embodiment are understood as follows.

(1) According to a first aspect, there is provided a remote evacuation guidance system (evacuation guidance system 100) including: a plurality of types of sensors 15 that are provided at a plurality of positions in a ship; an evacuation guidance device 20 that is provided in the ship; and a land evacuation guidance system (land system 40) that is provided on land. The land evacuation guidance system (land system 40) includes a sensor information acquisition unit 41 that acquires sensor information detected by the sensors, an onboard situation reproduction unit 43 that reproduces a situation in the ship on the basis of the sensor information such that the situation is capable of being experienced in a simulated manner, an evacuation route setting unit (control unit 42) that sets an evacuation route on the basis of the reproduced situation in the ship, a guidance information generation unit (control unit 42) that generates evacuation guidance instruction information for guiding a evacuation of a passenger along the evacuation route, and a transmission unit (communication unit 47) that transmits the evacuation guidance instruction information to the evacuation guidance device.

Therefore, the land system 40 can perform the evacuation guidance of the passenger in the ship.

(2) According to a second aspect, in the remote evacuation guidance system (evacuation guidance system 100) according to (1), the land evacuation guidance system (land system 40) further includes a position information acquisition unit (sensor information acquisition unit 41) that acquires position information of the passenger in the ship and a passenger map information generation unit (control unit 42) that generates passenger map information indicating a position of the passenger in the ship on the basis of the position information. The evacuation route setting unit sets the evacuation route on the basis of the passenger map information and the situation in the ship.

Therefore, it is possible to set the evacuation route in consideration of the position of the passenger.

(3) According to a third aspect, in the remote evacuation guidance system (evacuation guidance system 100) according to (1) to (2), the onboard situation reproduction unit 43 generates at least one of virtual reality space information (VR) and experiential information (4DX).

Since the virtual reality space information and the experiential information (when a chair is moved to reproduce the tilt and shaking of the hull or when smoke, odor, wind, and spray are injected to reproduce the tilt and shaking, control information, such as the movement of the chair and the amount of injection, for implementing the movement of the chair and the injection of smoke and the like) are generated, the observer can experience the situation in the ship in the simulated manner.

(4) According to a fourth aspect, in the remote evacuation guidance system (evacuation guidance system 100) according to (1) to (3), the evacuation guidance device 20 is at least one of a display device 20*a*, a speaker 20*b*, a direction indicator 20*c*, and a robot 20*d*, and the sensors include two or more of a camera 15*a*, a microphone 15*b*, a vibration sensor 15*f*, an odor sensor 15*g*, a tilt sensor 15*c*, an acceleration sensor, a temperature sensor 15*d*, and a humidity sensor 15*e*.

The display device 20*a*, the speaker 20*b*, and the direction indicator 20*c* provided in the ship can be controlled from land. The robot 20*d* can be used for the evacuation guidance. The use of the sensors makes it possible to reproduce sound, odor, tilt, shaking, temperature (heat), and the like, in addition to visual information in the ship.

(5) According to a fifth aspect, the remote evacuation guidance system (evacuation guidance system 100) according to (1) to (4) further includes a mobile terminal 30 that is possessed by the passenger in the ship, and the transmission unit transmits the evacuation guidance instruction information to the mobile terminal.

Therefore, the evacuation guidance can be performed on each passenger by, for example, individually guiding the evacuation route.

(6) According to a sixth aspect, in the remote evacuation guidance system (evacuation guidance system 100) according to (5), the land evacuation guidance system (land system 40) and the mobile terminal 30 are capable of transmitting and receiving at least one of an image and a voice therebetween to perform two-way communication.

Therefore, the evacuation guidance can be performed on each passenger from land on an individual basis.

(7) According to a seventh aspect, there is provided a land evacuation guidance system (land system 40) including: a sensor information acquisition unit 41 that acquires sensor information detected by a plurality of types of sensors provided at a plurality of positions in a ship, an onboard situation reproduction unit 43 that reproduces a situation in the ship on the basis of the sensor information such that the situation is capable of being experienced in a simulated manner, an evacuation route setting unit (control unit 42) that sets an evacuation route on the basis of the reproduced situation in the ship, a guidance information generation unit (control unit 42) that generates evacuation guidance instruction information for guiding evacuation of a passenger along the evacuation route, and a transmission unit (communication unit 47) that transmits the evacuation guidance instruction information to an evacuation guidance device provided in the ship.

Therefore, the evacuation guidance can be performed from land by experientially understanding the situation in the ship and controlling the evacuation guidance device in the ship.

(8) According to an eighth aspect, there is provided an onboard evacuation guidance system (onboard system 10) including: a plurality of types of sensors 15 that are provided at a plurality of positions in a ship; an evacuation guidance device 20 that is provided in the ship; a sensor information acquisition unit 11 that acquires sensor information detected by the sensors; a control unit 12 that controls the evacuation guidance device; and a communication unit 14 that transmits the sensor information acquired by the sensor information acquisition unit to a land evacuation guidance system and receives a control signal for controlling the evacuation guidance device from the land evacuation guidance system.

The situation in the ship detected by the sensor 15 is transmitted to the land evacuation guidance system, and the evacuation guidance device in the ship is controlled on the basis of the control signal acquired from the land evacuation guidance system, which makes it possible to perform the evacuation guidance of the passenger in cooperation with the land evacuation guidance system.

(9) According to a ninth aspect, there is provided a remote evacuation guidance method including: a step of allowing a land evacuation guidance system that is provided on land to acquire sensor information detected by a plurality of types of sensors provided at a plurality of positions in a ship; a step of allowing the land evacuation guidance system to reproduce a situation in the ship on the basis of the sensor information such that the situation is capable of being experienced in a simulated manner; a step of allowing the land evacuation guidance system to set an evacuation route on the basis of the reproduced situation in the ship; a step of allowing the land evacuation guidance system to generate evacuation guidance instruction information for guiding evacuation of a passenger along the evacuation route; and a step of transmitting the evacuation guidance instruction information to an evacuation guidance device provided in the ship.

INDUSTRIAL APPLICABILITY

According to the remote evacuation guidance system, the land evacuation guidance system, the onboard evacuation guidance system, and the remote evacuation guidance method described above, the evacuation guidance of the passengers in the ship can be performed from land.

REFERENCE SIGNS LIST

100: Evacuation guidance system
1: Ship
10: Onboard system
11: Sensor information acquisition unit
12: Control unit
13: Storage unit
14: Communication unit
15: Sensor
15*a*: Camera
15*b*: Microphone
15*c*: Tilt sensor
15*d*: Temperature sensor
15*e*: Humidity sensor
15*g*: Odor sensor
15*f*: Vibration sensor
20: Evacuation guidance device
20*a*: Display device
20*b*: Speaker
20*c*: Direction indicator
20*d*: Robot

30: Mobile terminal
30*a*: Smartphone
30*b*: Wearable terminal
31: Positioning sensor
32: Camera
33: Microphone
34: Display unit
35: Speaker
36: Control unit
37: Storage unit
38: Communication unit
40: Land system
41: Sensor information acquisition unit
42: Control unit
43: Onboard situation reproduction unit
44: Input unit
45: Output unit
46: Storage unit
47: Communication unit
900: Computer
901: CPU
902: Main storage device
903: Auxiliary storage device
904: Input/output interface
905: Communication interface

The invention claimed is:

1. A remote evacuation guidance system comprising:

a plurality of types of sensors that are provided at a plurality of positions in a ship;

an evacuation guidance device that is provided in the ship; and a land evacuation guidance system that is provided on land, wherein the land evacuation guidance system includes a sensor information acquisition unit that acquires sensor information detected by the sensors, an onboard situation reproduction unit that reproduces a situation in the ship on the basis of the sensor information such that the situation is capable of being experienced in a simulated manner on the land, an evacuation route setting unit that sets an evacuation route on the basis of the reproduced situation in the ship, a guidance information generation unit that generates evacuation guidance instruction information for guiding evacuation of a passenger along the evacuation route, and a transmission unit that transmits the evacuation guidance instruction information to the evacuation guidance device.

2. The remote evacuation guidance system according to claim 1, wherein the land evacuation guidance system further includes a position information acquisition unit that acquires position information of the passenger in the ship, and a passenger map information generation unit that generates passenger map information indicating a position of the passenger in the ship on the basis of the position information, and the evacuation route setting unit sets the evacuation route on the basis of the passenger map information and the situation in the ship.

3. The remote evacuation guidance system according to claim 1, wherein the onboard situation reproduction unit generates at least one of virtual reality space information and experiential information.

4. The remote evacuation guidance system according to claim 1, wherein the evacuation guidance device is at least one of a display device, a speaker, a direction indicator, and a robot, and the sensors include two or more of a camera, a microphone, a vibration sensor, an odor sensor, a tilt sensor, an acceleration sensor, a temperature sensor, and a humidity sensor.

5. The remote evacuation guidance system according to claim 1, further comprising:

a mobile terminal that is possessed by the passenger in the ship, wherein the transmission unit transmits the evacuation guidance instruction information to the mobile terminal.

6. The remote evacuation guidance system according to claim 5, wherein the land evacuation guidance system and the mobile terminal are capable of transmitting and receiving at least one of an image and a voice therebetween to perform two-way communication.

7. A land evacuation guidance system comprising:

a sensor information acquisition unit that acquires sensor information detected by a plurality of types of sensors provided at a plurality of positions in a ship;

an onboard situation reproduction unit that reproduces a situation in the ship on the basis of the sensor information such that the situation is capable of being experienced in a simulated manner on the land;

an evacuation route setting unit that sets an evacuation route on the basis of the reproduced situation in the ship;

a guidance information generation unit that generates evacuation guidance instruction information for guiding evacuation of a passenger along the evacuation route; and a transmission unit that transmits the evacuation guidance instruction information to an evacuation guidance device provided in the ship.

8. A remote evacuation guidance method comprising:

a step of allowing a land evacuation guidance system that is provided on land to acquire sensor information detected by a plurality of types of sensors provided at a plurality of positions in a ship;

a step of allowing the land evacuation guidance system to reproduce a situation in the ship on the basis of the sensor information such that the situation is capable of being experienced in a simulated manner on the land;

a step of allowing the land evacuation guidance system to set an evacuation route on the basis of the reproduced situation in the ship;

a step of allowing the land evacuation guidance system to generate evacuation guidance instruction information for guiding evacuation of a passenger along the evacuation route; and a step of transmitting the evacuation guidance instruction information to an evacuation guidance device provided in the ship.

* * * * *